(12) United States Patent
Kobayashi

(10) Patent No.: US 9,339,906 B2
(45) Date of Patent: May 17, 2016

(54) PNEUMATIC BEVELER

(71) Applicant: SP AIR KABUSHIKI KAISHA, Nagano (JP)

(72) Inventor: Shigeki Kobayashi, Nagano (JP)

(73) Assignee: SP Air Kabushiki Kaisha, Nagano (JP)

( * ) Notice: Subject to any disclaimer, the term of this patent is extended or adjusted under 35 U.S.C. 154(b) by 171 days.

(21) Appl. No.: 14/312,069

(22) Filed: Jun. 23, 2014

(65) Prior Publication Data
US 2015/0367469 A1 Dec. 24, 2015

(51) Int. Cl.
B23C 3/12 (2006.01)
B23C 1/20 (2006.01)
B23Q 11/00 (2006.01)
B23C 9/00 (2006.01)

(52) U.S. Cl.
CPC .............. B23Q 11/005 (2013.01); B23C 3/126 (2013.01); B23C 9/005 (2013.01); *B23C 2220/16* (2013.01); *B23C 2270/027* (2013.01); *Y10T 409/304088* (2015.01); *Y10T 409/304144* (2015.01); *Y10T 409/306496* (2015.01); *Y10T 409/308176* (2015.01); *Y10T 409/308624* (2015.01)

(58) Field of Classification Search
CPC ........... Y10T 409/304144; Y10T 409/304088; Y10T 409/306216; Y10T 409/306272; Y10T 409/306328; Y10T 409/306384; Y10T 409/30644; Y10T 409/306496; Y10T 409/306552; Y10T 409/306608; Y10T 409/3042; Y10T 409/304256; B23Q 11/005; B23Q 9/0028; B23C 3/126; B23C 1/20; B23C 3/12–3/128; B23C 3/28–3/34; B23C 2220/16; B23C 2220/20; B23C 2220/36; B23C 2220/40; B23C 2230/00; B23C 2230/04; B23C 2270/027; B27C 5/10; B24B 55/06; B24B 23/026; B24B 55/102
USPC ................. 409/138, 137, 175–182, 139–140; 144/154.5, 136.95, 252.1, 252.2
See application file for complete search history.

(56) References Cited

U.S. PATENT DOCUMENTS

| | | | | | |
|---|---|---|---|---|---|
| 1,514,894 | A | * | 11/1924 | Carter | B27C 5/10 409/182 |
| 2,452,268 | A | * | 10/1948 | Schumann | B24B 23/02 409/137 |
| 3,119,304 | A | * | 1/1964 | Doeden | B23Q 11/005 29/DIG. 81 |
| 3,304,051 | A | * | 2/1967 | Thomas | B23Q 11/005 415/80 |
| 3,603,045 | A | * | 9/1971 | Mighton | B23Q 11/005 451/344 |
| 4,964,765 | A | * | 10/1990 | Kishi | B23C 3/126 409/181 |
| 5,591,070 | A | * | 1/1997 | Kachich | B24B 23/026 173/169 |
| 5,772,367 | A | * | 6/1998 | Daniel | B23Q 11/005 408/67 |
| 7,070,371 | B2 | * | 7/2006 | Choi | B23C 3/126 409/137 |
| 7,635,242 | B2 | * | 12/2009 | Jeon | B23C 3/126 409/180 |
| 2009/0075572 | A1 | * | 3/2009 | Izumisawa | B24B 55/10 451/294 |

* cited by examiner

*Primary Examiner* — Erica E Cadugan
(74) *Attorney, Agent, or Firm* — Senniger Powers LLP

(57) ABSTRACT

A pneumatic rotary tool including a housing having an inlet passage. The inlet passage extends from an inlet operatively connectable to an air source. The inlet passage extends to a motor cylinder inside the housing. The housing has an outlet passage extending from the motor cylinder to an outlet. The tool includes a rotor mounted in the cylinder for rotation relative to the cylinder under pneumatic power. The tool includes a valve positioned along the inlet passage operable to selectively permit air to pass for rotating the rotor and flowing through the outlet. The tool has a cutter head connected to the rotor including a clamp for holding a cutter to cut material as the head rotates. The cutter head is positioned in the outlet so air passing through the outlet passes over the head to blow material away from the head as the cutter cuts the material.

20 Claims, 5 Drawing Sheets

(a)

(b)

(d)

(c)

(a)

(b)

PNEUMATIC BEVELER

BACKGROUND

The present invention generally relates to pneumatic rotary tools, and more particularly, to an improved pneumatic rotary tool having an exhaust positioned for clearing shavings and debris.

Pneumatic rotary tools are used for cutting material. For example, a pneumatic beveling tool or pneumatic beveler is used to shape (e.g., bevel or round edge) material along a corner. Cutting tools such as this include cutters that cut away portions of the material. In the case of the beveling tool, the cutters (e.g., ceramic cutters) are fixed to a head at an angle and rotated about a central axis of the head. The tool rotates the cutters around the axis so the cutters shave away bits of material when the tool is brought into proximity with the material. The tool includes a central bearing on the cutter that engages one surface of the material and a flange of the cutter tool engages another surface of the material positioned on an opposite side of the corner being cut. The shavings cut from the material may build up and interfere with advancement of the bearing or flange along the respective surfaces of the material. Such interference may cause an uneven cut or scratch the material with the shavings. Thus, there is a need to remove these shavings from the vicinity of the cutter as the tool cuts the material.

SUMMARY

In one aspect, the present invention includes a pneumatic rotary tool, comprising a housing having an inlet passage. The inlet passage extends from an inlet operatively connectable to an air source. The inlet passage extends to a motor cylinder inside the housing. The housing has an outlet passage extending from the motor cylinder to an outlet. The tool also includes a rotor rotatably mounted in the motor cylinder for rotation relative to the cylinder under pneumatic power. Further, the tool comprises a valve positioned along the inlet passage operable to selectively permit air to pass through the inlet passage to the motor cylinder for rotating the rotor relative to the cylinder. Air flows through the motor cylinder as the rotor rotates and through the outlet passage to the outlet of the housing. The tool has a cutter head operatively connected to the rotor for rotation relative to the housing in response to rotation of the rotor. The cutter head comprises a clamp for selectively holding a cutter so the cutter moves to cut material as the cutter head rotates relative to the housing. The cutter head is positioned in the housing outlet so air passing through the outlet passes over the head to blow material away from the head as the cutter cuts the material.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
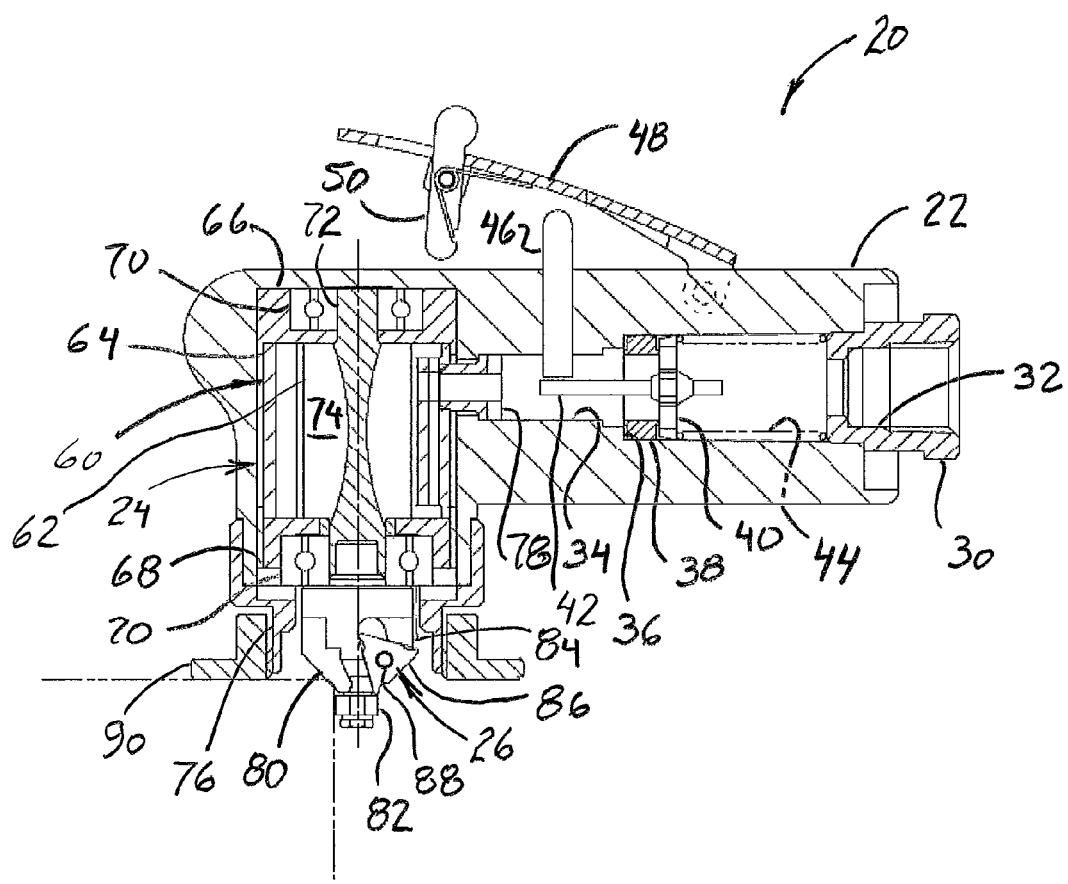
FIG. 1 is a vertical cross section of a pneumatic beveler of the present invention.

Referring to FIG. 1, a pneumatic beveling tool or beveler incorporating one embodiment of the present invention is designated in its entirety by the reference number 20. The tool 20 generally comprises an L-shaped housing 22, a motor (generally designated by 24), and a cutter assembly (generally designated by 26). A fitting 30 mounted at an upstream end of the housing 22 is adapted to connect to a conventional air hose (not shown) supplied with air from a conventional air source (not shown). The fitting 30 is attached to the housing 22 (e.g., with screw threads) forming an inlet 32 of the housing. An inlet passage 34 extends between the inlet 32 and the motor 24 for delivering air from the air source to the motor. The inlet passage 34 includes a shoulder 36 for accepting an annular seal 38. A valve body 40 having a central stem 42 is biased against the seal 38 by a coil spring 44 held in the inlet passage 34 by the fitting 30. When the valve body 40 is seated against the seal 38, the inlet passage 34 is blocked, preventing air from passing from the inlet 32 to the motor 24. When the valve body 40 is tilted in the passage 34 so the stem 42 is offset (i.e., angled) with respect to the inlet passage, air is free to pass the valve body and enter the motor 24. A rod 46 extending through the housing 22 is provided to tilt the stem 42 and open the valve 40. A conventional trigger 48 is pivotally mounted on housing 22 for selectively pushing the rod 46 to open the valve 40. In the embodiment shown, a spring biased safety 50 mounted on the trigger 48 selectively engages the housing 22 to prevent the trigger from being inadvertently depressed and opening the valve 40. The safety 50 may be pivoted against trigger 48 (rotated counterclockwise as shown), allowing the trigger to be depressed to tilt the stem 42 and open the valve 40.

The motor 24 is mounted in the housing 20. The motor 24 includes a cylinder, generally designated by 60, and a rotor, generally designated by 62, rotatably mounted in the cylinder. The cylinder 60 includes a shell 64, an upstream end plate 66, and a downstream end plate 68. Each end plate 66, 68 holds a ball bearing 70 that receives a stub shaft 72 of the rotor 62. The rotor 62 holds rotor blades 74 that seal against an inside surface of the shell 64. A threaded cap 76 fastened to the housing 22 holds the assembled motor 24 in place in the housing. A passaged bolt 78 extends through the housing 22 at a downstream end of the inlet passage 34 to prevent the motor 24 from turning in the housing. In other embodiments, it is envisioned that other fastening means or a unitary cylinder and housing construction may be used without departing from the scope of the present invention.

The cutter assembly 26 is fastened to the lower stub shaft 72. The cutter assembly 26 includes a generally conical cutter head 80 having a small bearing 82 mounted at its tip. As will be appreciated by those skilled in the art, the bearing 82 is useful in positioning the cutter head 80 relative to the material being cut. The cutter head 80 includes three equally spaced cutter mounts or clamps 84 on which cutters 86 (e.g., ceramic bevel or round edge cutters) may be mounted, such as with screw fasteners 88. As will be appreciated by those skilled in the art, the removable cutters 86 permit cutter repositioning (i.e., rotation) when the cutter becomes dull or damaged. A threaded flange 90 is fastened to the cap 76. As the flange 90 rotates on the cap 76, the flange moves upward and downward relative to the cutter assembly 26 for adjusting the depth of cut made by the cutter assembly. A set screw (not shown) is provided to prevent the flange 90 from rotating, thereby fixing the adjusted maximum depth of cut.

Figure 2:
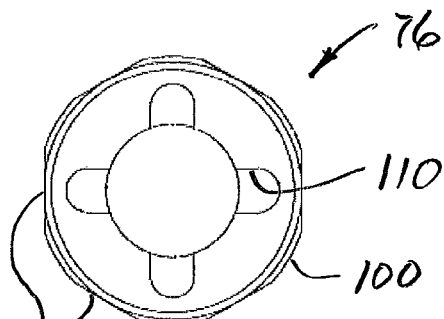
FIGS. 2a-d are a bottom plan, side elevation, top plan, and vertical cross section, respectively, of a cap of the beveler.
Figure 2:
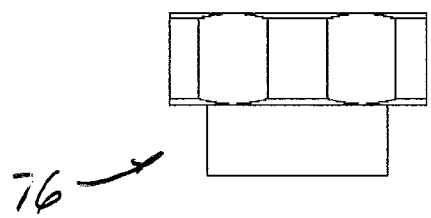
Figure 2:
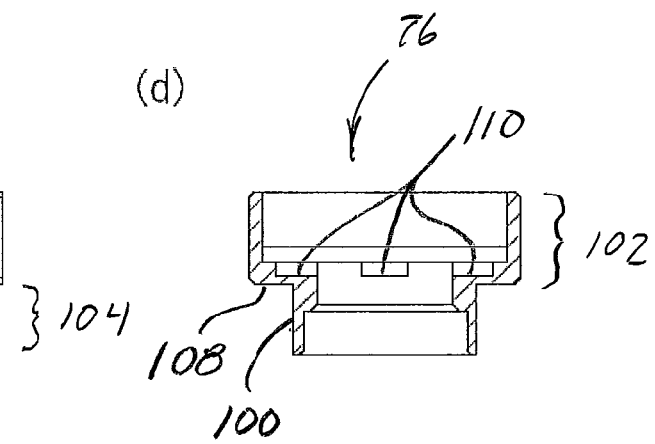
Figure 2:
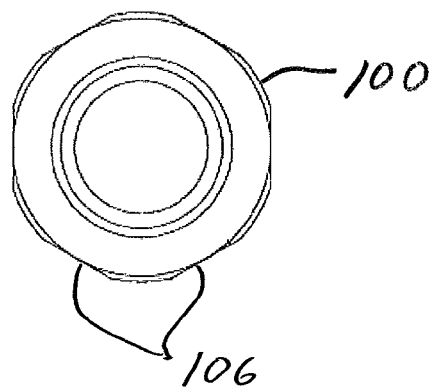

As illustrated in FIG. 2, the cap 76 includes an annular body 100 having an upper portion 102 and a lower portion 104. The upper portion 102 includes internal threading (not shown) corresponding with threads on the housing 22 for fastening the cap 76 to the housing to capture the motor 24 in the housing. An exterior surface of the cap 76 includes wrenching flats 106 for turning the cap when attaching the cap to and detaching the cap from the housing. A step 108 separates the upper portion 102 from the lower portion 104. A face of the step 108 includes four equally spaced grooves or slots 110 permitting air to pass between the face and the adjacent ball bearing 70. The lower portion 104 includes exterior threading (not shown) for attaching the flange 90 to the cap 76.

Figure 3:
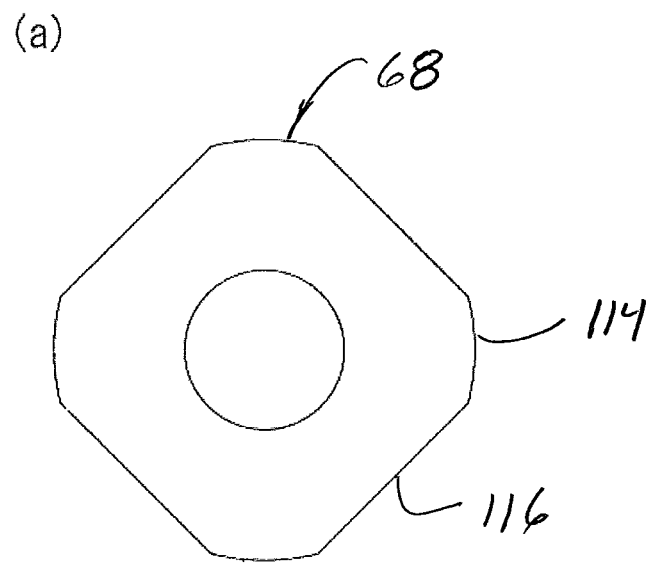
FIGS. 3a,b are a top plan and vertical cross section, respectively, of a front plate of the beveler.
Figure 3:
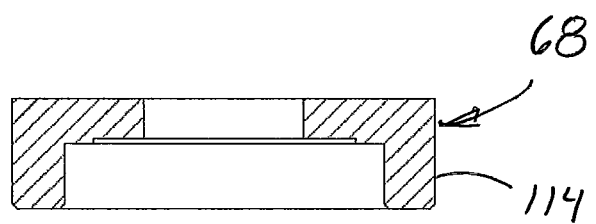

FIG. 3 shows the lower end plate 68 that holds the ball bearing 70 and the lower end stub shaft 72 of the rotor 62. An inner diameter and a face of the plate 68 are adapted for holding the ball bearing 70. A spacer 112 (FIG. 4) is provided in the end plate 68 for centering the rotor stub shaft 72. An exterior surface 114 of the lower end plate 68 includes four equally spaced flat lands 116 that permit air to pass between the plate and a bore 118 in the housing 22 when exiting the cylinder. Together, the grooves 110 in the cap 76 and the lands 116 on the end plate 68 form part of the outlet passage that delivers air from the cylinder 60 to an outlet 120.

Figure 4:
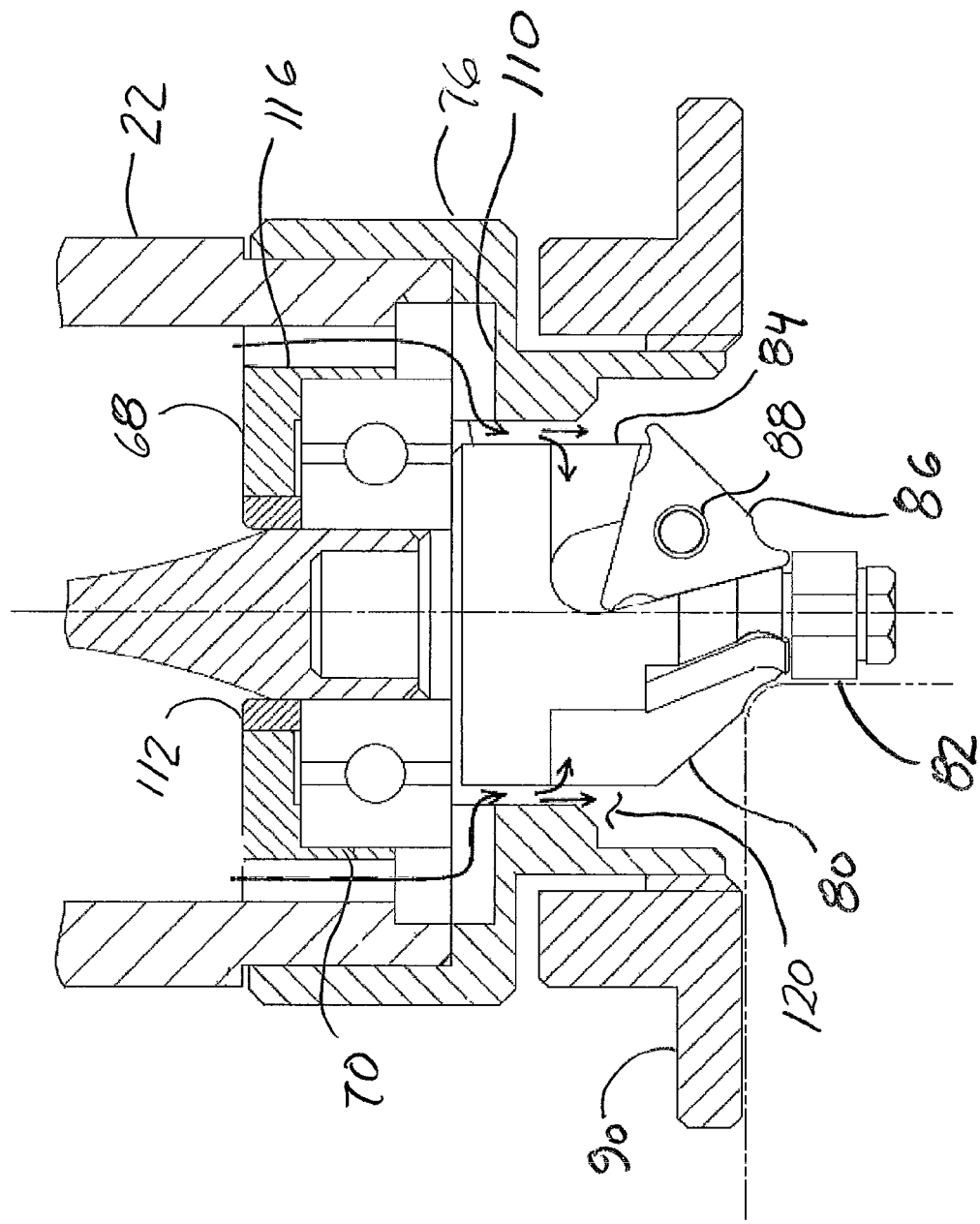
FIG. 4 is a partial fragmentary cross section of a cutter head of the beveler.
Figure 5:
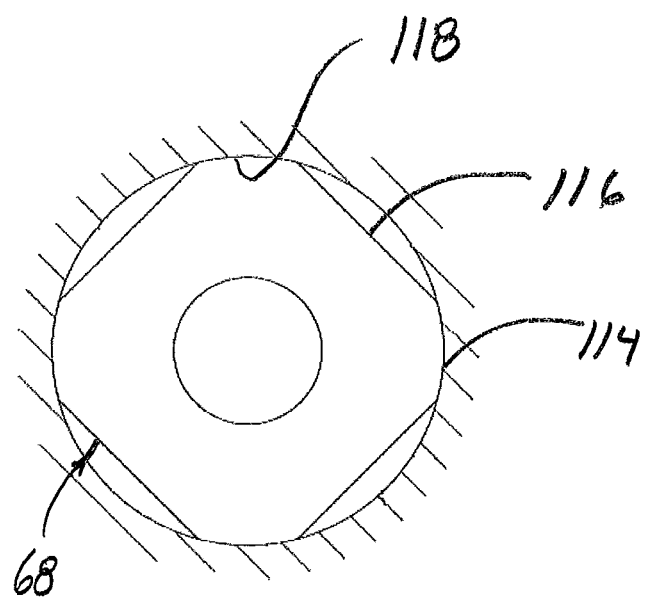
FIG. 5 is a horizontal section through the beveler taken immediately above the front plate.

As shown in FIG. 4, air departing the cylinder 60 passes between the lands 116 on the end plate 68 and the housing 22, between the ball bearing 70 and housing, through the grooves 110 in the cap 76, and between the cutter head 80 and the cap 76. A lower end of the outlet passage between the cutter head 80 and cap 76 forms the outlet 120 through which air is exhausted after passing through the motor 24. The cutter head 80 is centered in the outlet 120 so the exhausting air passes over the cutter head 80 and surrounding surfaces to remove shavings and other debris from the surfaces of the material. By removing the shavings, there is less opportunity for the shavings to affect tool movement or damage the material. The portion of the passage between the end plate 68 and housing 22 is shown in FIG. 5.

When the safety 50 is disengaged and the trigger 48 is depressed, the valve 40 opens permitting air to pass through the inlet passage 34 toward the motor 24. When air enters the motor 24, a pressure difference across the rotor blades 74 until the rotor 62 turns in the cylinder 60. The cutter head 80 turns with the rotor 62 to rotate the cutters 86. The user pushes the cutter assembly ball bearing 82 and the face of flange 90 against the material to position and stabilize the tool 20. In addition, the user moves the tool 20 along the corner of the material. The cutters 86 shave the material leaving small shavings around the cutter head 80. Air passing through the motor 24 travels along the outlet passage to the outlet. The air passing through the outlet blows the shavings away from the cutter head 80 preventing uneven cutting and material damage.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A pneumatic rotary tool, comprising:
a housing having an inlet passage extending from an inlet operatively connectable to an air source for providing air to power the tool, said inlet passage extending to an upstream end of a motor cylinder that is inside the housing, the housing having an outlet passage extending from a downstream end of the motor cylinder to an outlet;
a rotor rotatably mounted in the motor cylinder for rotation relative to the cylinder under pneumatic power;
a valve positioned along the inlet passage operable to selectively permit air to pass through the inlet passage to the motor cylinder for rotating the rotor relative to the cylinder, air flowing through the motor cylinder as the rotor rotates and through the outlet passage to the outlet;
a cutter head operatively connected to the rotor for rotation relative to the housing in response to rotation of the rotor, said cutter head comprising a clamp for selectively holding a cutter so the cutter moves to cut material as the cutter head rotates relative to the housing, said cutter head being positioned in the outlet so air passing through the outlet passes over the head to blow material away from the cutter head as the cutter cuts the material; and
wherein the downstream end of the cylinder has an outer perimeter including a plurality of areas that are spaced from an inner wall of the housing so each area forms with the wall a respective air passage that is in fluid communication with the outlet.

2. A tool as set forth in claim 1, further comprising a flange surrounding the outlet and cutter for contacting the material being cut to stabilize the tool as the material is cut.

3. A tool as set forth in claim 2, wherein the flange is moveable relative to the cutter to selectively adjust a depth of cut.

4. A tool as set forth in claim 1, wherein the cutter head is adapted to hold bevel cutters.

5. A tool as set forth in claim 1, wherein the cutter head is connected directly to the rotor.

6. A tool as set forth in claim 1, wherein the cutter head is centered in the outlet.

7. A tool as set forth in claim 1, wherein the outlet passage is defined in part by a plate forming the downstream end of the cylinder.

8. A tool as set forth in claim 7, wherein the plate holds a bearing in which the rotor rotates.

9. A tool as set forth in claim 8, further comprising a cap fastened to the housing for holding the bearing against the plate.

10. A tool as set forth in claim 9, wherein the cap is threadably fastened to the housing.

11. A tool as set forth in claim 9, wherein the cap includes an opening formed in a face adjacent the bearing for allowing air to pass through the cap.

12. A tool as set forth in claim 11, wherein the opening comprises a slot formed in the face of the cap.

13. A tool as set forth in claim 9, wherein the cap includes a plurality of slots formed in a face adjacent the bearing to allow air to pass through the cap, said plurality of slots defining a portion of the outlet passage.

14. A tool as set forth in claim 13, wherein the plurality of slots comprises four slots.

15. A tool as set forth in claim 13, wherein the cap and the plate are configured such that air flows through the air passages to the slots.

16. A tool as set forth in claim 9, wherein the outlet passage includes a space between the cutter head and the cap.

17. A tool as set forth in claim 8, wherein the plate centers the rotor in the cylinder.

18. A tool as set forth in claim 17, wherein a spacer is provided in the plate for centering the rotor in the cylinder.

19. A tool as set forth in claim 1, wherein each of said areas comprises a flat land formed at the outer perimeter of the plate.

20. A tool as set forth in claim 1, wherein said plurality of areas comprises four areas.

\* \* \* \* \*